(12) United States Patent
Sugimoto et al.

(10) Patent No.: US 7,318,601 B2
(45) Date of Patent: Jan. 15, 2008

(54) AIRBAG AND AIRBAG SYSTEM

(75) Inventors: Shinichi Sugimoto, Tokyo (JP);
Akifumi Takedomi, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/522,463

(22) Filed: Sep. 18, 2006

(65) Prior Publication Data
US 2007/0080522 A1 Apr. 12, 2007

(30) Foreign Application Priority Data
Oct. 6, 2005 (JP) ............... 2005-294219

(51) Int. Cl.
*B60R 21/16* (2006.01)
(52) U.S. Cl. ............... 280/730.1; 280/730.2; 297/216.12
(58) Field of Classification Search ............. 280/743.1, 280/730.1, 730.2, 736, 728.1, 728.2; 297/216.1, 297/216.13, 216.12
See application file for complete search history.

(56) References Cited

U.S. PATENT DOCUMENTS

| 3,753,756 | A | * | 8/1973 | Lox et al. ............... 427/244 |
| 5,738,407 | A | | 4/1998 | Locke |
| 6,158,812 | A | * | 12/2000 | Bonke ............... 297/391 |
| 6,572,137 | B2 | | 6/2003 | Bossecker et al. |
| 6,877,772 | B2 | * | 4/2005 | Fischer et al. ............ 280/743.1 |
| 7,004,496 | B2 | | 2/2006 | Bossecker et al. |
| 7,040,651 | B2 | | 5/2006 | Bossecker et al. |
| 2002/0014760 | A1 | * | 2/2002 | Bossecker et al. ....... 280/730.1 |
| 2004/0113402 | A1 | * | 6/2004 | Bossecker et al. ....... 280/730.2 |

FOREIGN PATENT DOCUMENTS

| DE | 202 16 611 U1 | 2/2003 |
| DE | 102 36 373 A1 | 2/2004 |
| DE | 102 48 532 A1 | 4/2004 |
| JP | 10071915 A * | 3/1998 |
| WO | WO 200021797 A1 * | 4/2000 |

OTHER PUBLICATIONS

U.S. Appl. No. 11/522,471, filed Sep. 18, 2006, Shinichi Sugimoto et al.

* cited by examiner

*Primary Examiner*—Christopher P. Ellis
*Assistant Examiner*—Joseph Rocca
(74) *Attorney, Agent, or Firm*—Foley and Lardner LLP

(57) ABSTRACT

An airbag includes a first panel adjacent to an occupant and a second panel opposite to the occupant; the airbag being capable of deploying above a vehicle occupant's head. The first and second panels are joined together. The airbag includes, between the first panel and the second panel, a main chamber for deploying above the head of the occupant with gas supplied from an inflator; and subchambers for deploying so as to bend the head of the occupant forward with the gas from the inflator.

10 Claims, 5 Drawing Sheets

AIRBAG AND AIRBAG SYSTEM

BACKGROUND

The present invention relates to an airbag system to be mounted to vehicles such as cars.

Various airbag systems, such as driver airbags that inflate from the rotational center of handles toward drivers and passenger airbags that inflate from instrument panels to passengers, have been generally used to restrain occupants' bodies in car collisions an so on.

In the event of accidents in which large external force is applied to cars, such as turnovers due to crashes and the fall of heavy bodies such as fallen trees, an impact may be given onto occupants' heads from above the occupants' heads. Thus, airbags to cope with such situations have been proposed (for example, refer to JP-A-2002-37011, which is incorporated by reference herein in its entirety).

SUMMARY

One embodiment of the invention relates to an airbag including a first panel adjacent to an occupant and a second panel opposite to the occupant, the first and second panels being joined together, between the first panel and the second panel. The airbag comprises: a main chamber for deploying above the head of the occupant with pressure fluid supplied from an inflator; and subchambers for deploying so as to bend the head of the occupant forward with the pressure fluid supplied from the inflator.

Another embodiment of the invention relates to an airbag system. The airbag system comprises: airbag including a first panel adjacent to an occupant and a second panel opposite to the occupant, the first and second panels being joined together, between the first panel and the second panel; and an inflator that supplies pressure fluid for inflating the airbag. The airbag comprises: a main chamber for deploying above the head of the occupant with pressure fluid supplied from an inflator; and subchambers for deploying so as to bend the head of the occupant forward with the pressure fluid supplied from the inflator; and It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1 is a schematic side view of a car seat including an embodiment of an airbag system according to the invention.

DETAILED DESCRIPTION

Figure 1A:
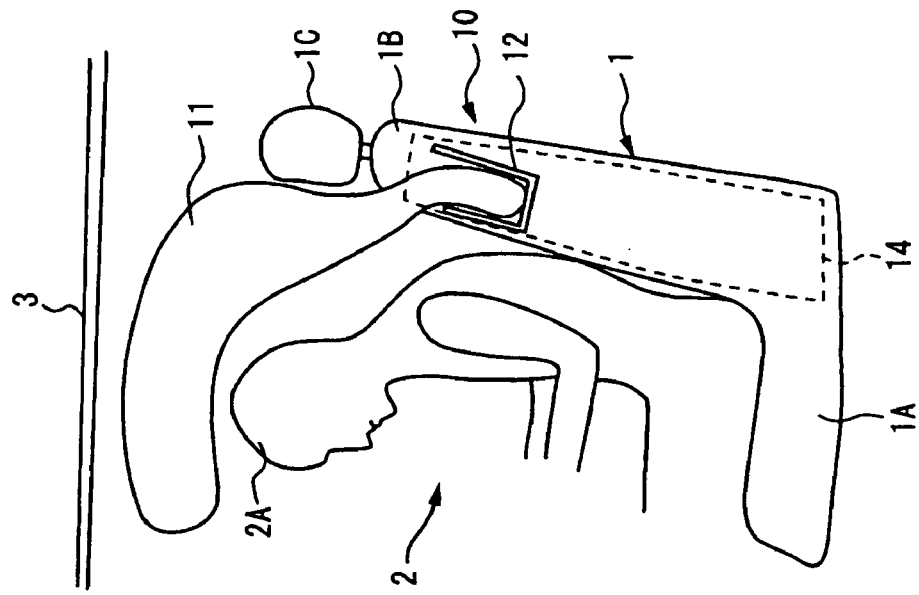
FIG. 1(a) illustrates the airbag prior to inflation and FIG. 1(b) illustrates the airbag during inflation.

The related art discloses a principal structure in which an airbag constituted by a bag made of joined base fabrics is housed in a seatback (or a headrest) of a vehicle, and pressure fluid from an inflator is supplied into the airbag in an emergency to deploy it above occupants' heads.

It is an object of the present invention to provide a structure capable of mass-producing airbags that deploy above occupants' heads.

A first embodiment of the invention is an airbag including a first panel adjacent to an occupant and a second panel opposite to the occupant, the first and second panels being joined together. The airbag includes, between the first panel and the second panel, a main chamber for deploying above the head of the occupant with pressure fluid supplied from an inflator, and subchambers for deploying so as to bend the head of the occupant forward with the pressure fluid supplied from the inflator.

When pressure fluid is supplied from the inflator to the airbag, the airbag inflates to deploy above an occupant's head, thereby restraining the upward movement of the occupant's head and the subchambers deploy to change the posture of the occupant so as to bend the occupant's head forward. The first embodiment is constructed such that the first panel and the second panel are joined together, between which the main chamber and the subchambers are provided. This simple structure in which both the chambers are formed only by the pair of panels facilitates stitching work in comparison with a structure in which the main chamber and the subchambers are constructed of a different pair of panels, and the panel pairs are communicated with each other through holes or tubes. In other words, the airbag including the main chamber and the subchambers may be mass-produced practically and effectively.

According to a second embodiment, the airbag of the first embodiment further includes a communicating path disposed between the first panel and the second panel joined together, the communicating path communicating the main chamber and the subchambers with each other.

This enables the pressure fluid from the inflator to be supplied to the subchamber via the communicating path only by supplying the pressure fluid to the main chamber.

According to a third embodiment, the subchamber of the second embodiment is disposed on each of a first side and a second side of the main chamber in an unfolded state.

Since the pressure fluid from the inflator is supplied to the main chamber to deploy it above the occupant's head, and then to deploy the subchambers on the first and second sides via the communicating paths, thereby enabling the occupant's head to be bent forward.

According to a fourth embodiment, the communicating path of the third embodiment extends from the main chamber to the first side and the second side in an unfolded state so as to extend to the subchambers on the first side and the second side.

Since the pressure fluid from the inflator is supplied to the main chamber to deploy it above the occupant's head, and then to deploy the subchambers on the first and second sides via the communicating paths on the first and second sides, thereby enabling the occupant's head to be bent forward.

According to a fifth embodiment, the airbag of one of second to fourth embodiments further includes a sealing member for sealing a joined portion between the first panel and the second panel, wherein the outer rims of the main chamber, the subchamber, and the communicating path are wrapped with the continuous sealing member as a whole.

The disposing of the sealing member made of a sealing material enables the leakage of pressure fluid from the seam to be reduced. Also, the main chamber, the subchamber, and the communicating path are enveloped with the continuous sealing member that seals the seam. Thus, the main chamber and the subchamber can be formed between the panels with a simple structure of the necessary and minimum stitches and sealing member.

A sixth embodiment comprises the airbag according to one of the first to fifth embodiments; and an inflator that supplies pressure fluid for inflating the airbag.

Embodiments of the invention may improve the stability of the entire airbag system and the flexibility of layout.

An embodiment of the present invention will be described hereinbelow with reference to the drawings.

Figure 1B:
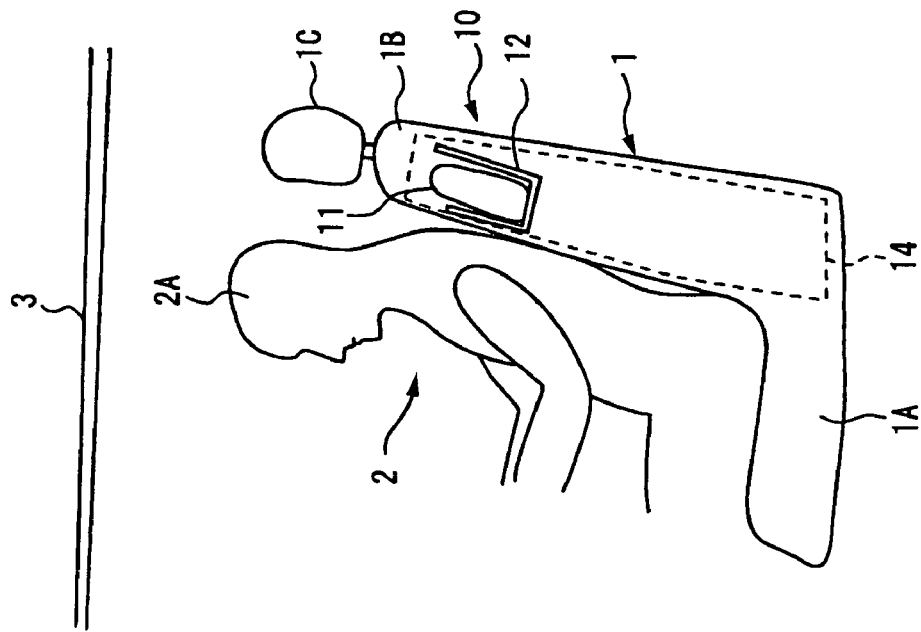

FIG. 1 is a schematic side view of a car seat 1 including an embodiment of the airbag according to the invention, wherein FIG. 1(a) shows a normal state, and FIG. 1(b) shows a state in which an airbag inflates. Referring to FIG. 1, an occupant 2 is seated on the seat 1. The seat 1 has a seat portion 1A, from which a backrest 1B projects upward. A headrest 1C is mounted on the top of the backrest 1B.

The seat 1 is equipped with an airbag system 10 in the backrest 1B, for restraining the head 2A of the occupant 2 at the turnover of the vehicle body in an accident. The airbag system 10 includes: an airbag 11 constituted by a bag 35 (see FIG. 5) formed of a first panel 35A and a second panel 35B (see FIG. 5) stitched together and deploying above the head 2A of the occupant 2 at inflation; a retainer 12 that accommodates the airbag 11 in a folded state; and an inflator 13 (see FIGS. 2 and 3) that supplies gas (pressure fluid) for inflating the airbag 11. The seat 1 contains a seat frame 14 constructed of side plates 14A (see FIG. 2) and a cross member 14B (see FIG. 2) to form the frame of the seat 1. The retainer 12 and the inflator 13 are disposed on the seat frame 14 (the details will be described later). The inflator 13 is ignited under the control of a control unit (not shown).

Referring to FIG. 1(a), the airbag 11 is normally housed in a folded state in the retainer 12. For example, when the car turns over, the inflator 13 of the airbag system 10 is ignited by the control unit (not shown) to deploy the airbag 11 between a roof 3 of the car and the head 2A of the occupant 2, as shown in FIG. 1(b). At that time, the airbag 11 inflates so as to push the head 2A of the occupant 2 forward by the action of subbags 11B (see FIGS. 4 and 5) to bend the head 2A of the occupant 2 forward, thereby reducing a load on the neck.

Figure 2:
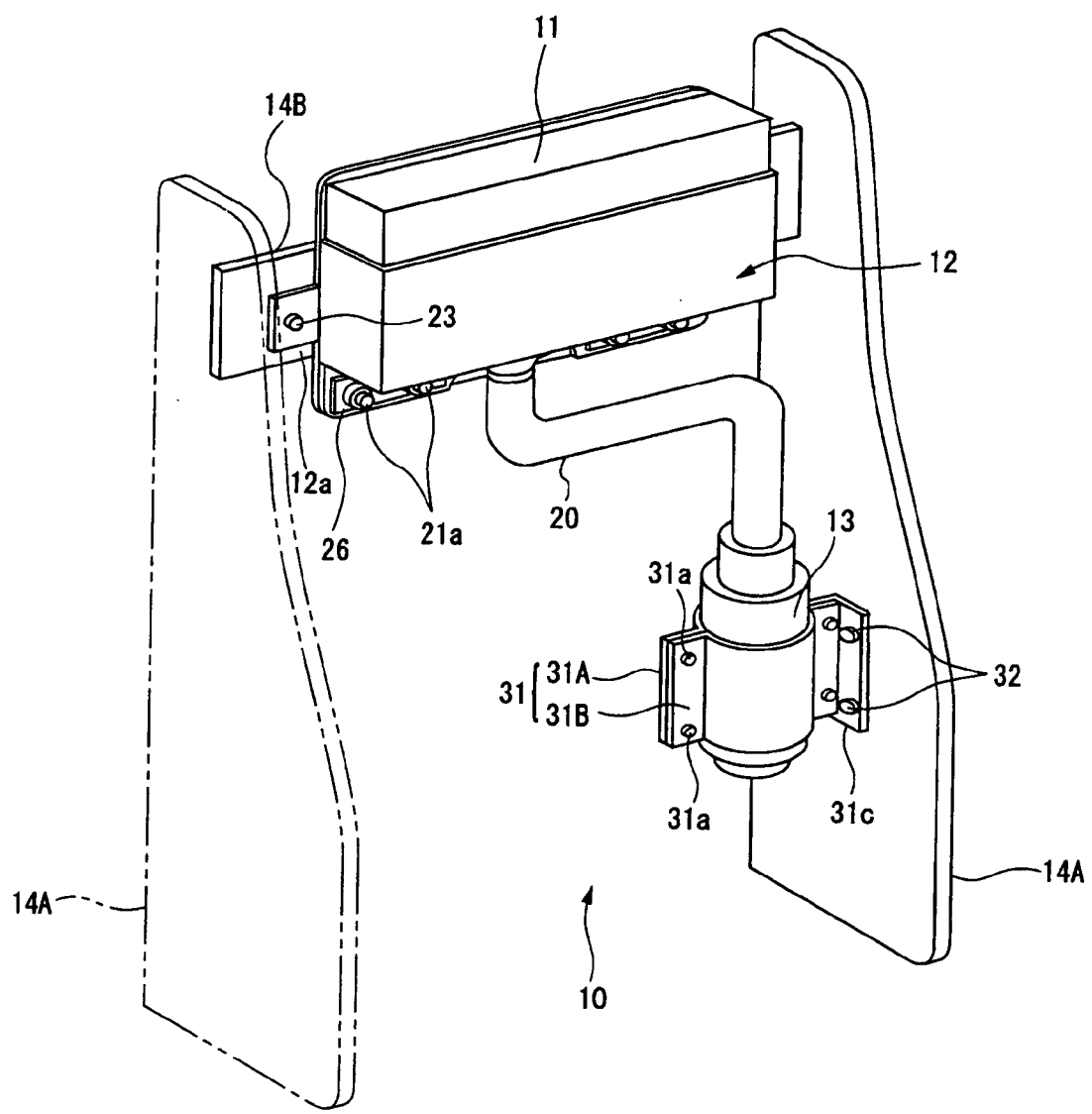
FIG. 2 is a perspective view of a structure of fixing the embodiment of the airbag system according to the invention to a seat frame.
Figure 3:
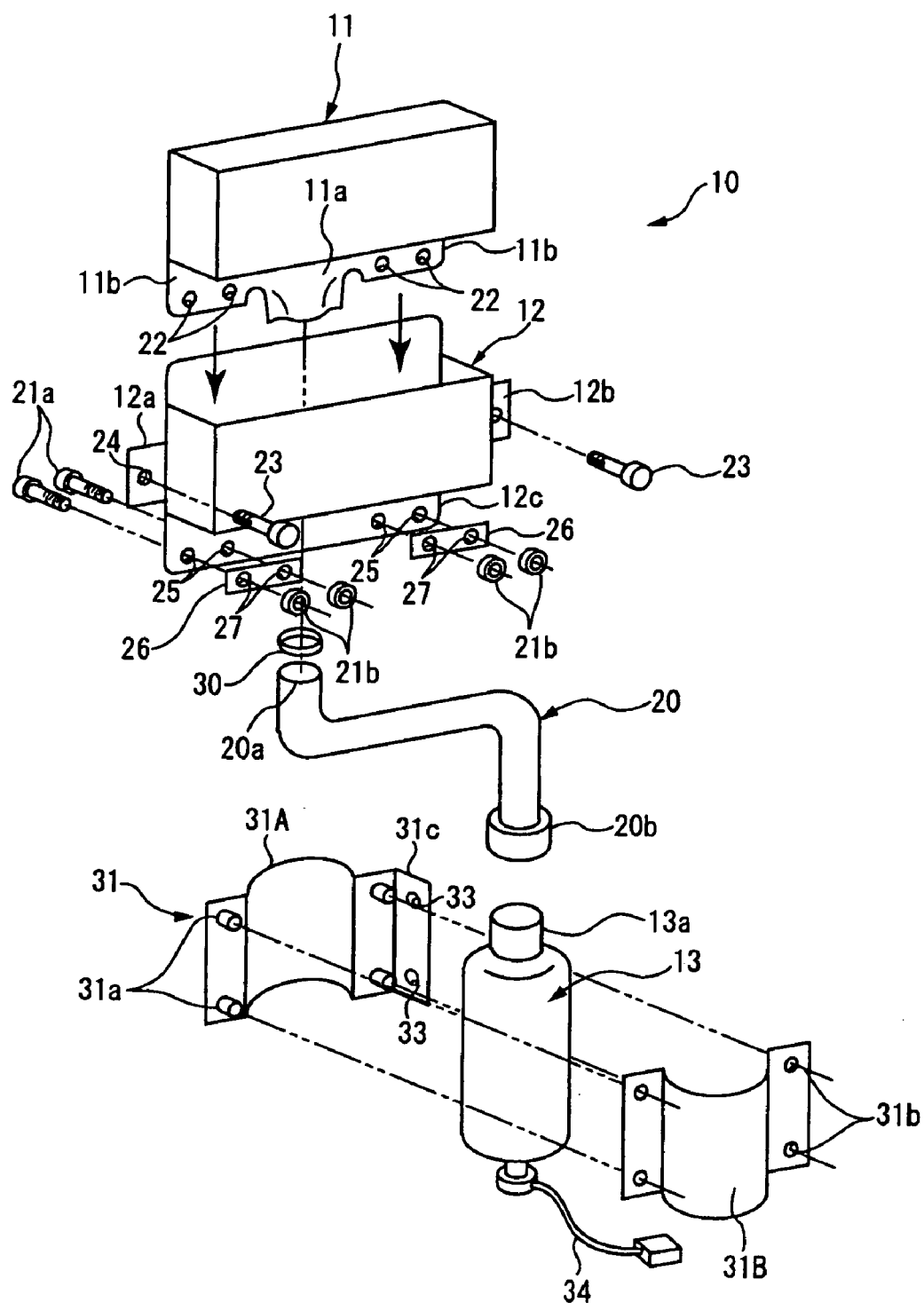
FIG. 3 is an exploded perspective view of the airbag system, showing the further details on the fixing structure of FIG. 2.

FIG. 2 is a perspective view of a structure of fixing the airbag system 10 to the seat frame 14. FIG. 3 is an exploded perspective view of the airbag system 10, showing the further details on the fixing structure.

Referring to FIGS. 2 and 3, the seat frame 14 includes the pair of side plates 14A and 14A disposed on both sides of the backrest 1B of the seat 1 in the vehicle width direction (on the right and left sides in FIG. 2) and the cross member 14B bridged between the side plates 14A and 14A across the width of the vehicle to connect them. Both of the side plates 14A and the cross member 14B are disposed in the backrest 1B. The seat frame 14 also includes a base plate (not shown) disposed in the seat portion 1A.

The airbag 11 has a gas feed port 11a connected to the inflator 13 via a pipe 20 and mounting pieces 11b and 11b on both sides of the gas feed port 11a at the base end of the airbag 11 (adjacent to the inflator, at the bottom in FIG. 3). The mounting pieces 11b and 11b each have two bolt holes 22 in which mounting bolts 21a for fixing the airbag 11 to the retainer 12 are to be passed through. The retainer 12 has mounting portions 12a and 12b in the vehicle width direction, each having a bolt hole 24 for a mounting bolt 23 for fixing the retainer 12 to pass through. The retainer 12 also has a mounting portion 12c at the lower part thereof (adjacent to the inflator, at the bottom in FIG. 3), the mounting portion 12c having bolt holes 25 in positions corresponding to the bolt holes 22 of the mounting pieces 11b.

With the airbag 11 housed in a folded state in the retainer 12, the plurality of (four in this embodiment) mounting bolts 21a are inserted into the bolt holes 25 of the retainer mounting portion 12c, the bolt holes 22 of the airbag mounting pieces 11b and 11b, and bolt holes 27 of mounting plates 26 provided at the positions corresponding to the bolt holes 22 of the airbag mounting pieces 11b, and are tightened with nuts 21b. Thus, the airbag 11 is fixed to the retainer 12 in a folded state. The plurality of (two in this embodiment) mounting bolts 23 pass through the bolt holes 24 of the retainer mounting portions 12a and 12b, and are then tightened in holes (not shown) of the cross member 14B. Thus, the retainer 12 in which the airbag 11 is housed in a folded state is secured to the cross member 14B.

The pipe 20 is made of metal or the like and is bent at a plurality of places (two places in this embodiment), and is disposed under the retainer 12. The pipe 20 and the airbag 11 are joined together in such a manner that the gas feed port 11a of the airbag 11 is put on the bag-side end 20a of the pipe 20 and swaged together with a clamp band 30 made of metal or the like. The pipe 20 and the inflator 13 are joined together in such a manner that a connecting portion 20b of the pipe 20 adjacent to the inflator 13 is put on the upper end 13a of the inflator 13 and bonded (welded) together. Thus, the airbag 11 and the inflator 13 are joined together with the pipe 20.

The inflator 13 is disposed under the pipe 20, and is mounted to one of the side plates 14A (in this embodiment, on the right in the vehicle width direction) with a mounting member 31. The mounting member 31 has a pair of mounting plates 31A and 31B that clamp the inflator 13 to support it. The mounting plates 31A and 31B are riveted to each other with the inflator 13 therebetween in such a manner that a plurality of (four in the embodiment) rivets 31a of the mounting plate 31A are inserted into a plurality of (four in this embodiment) rivet holes 31b provided at corresponding positions of the mounting plates 31B. The mounting plate 31A has a mounting portion 31c at one side (on the right in the vehicle width direction) which is bent substantially at 90 degrees. A plurality of (two in the embodiment) mounting bolts 32 are inserted into bolt holes 33 of the mounting portion 31c and are then secured in fastening holes (not shown) of the side plate 14A so that the mounting member 31 is secured to the side plate 14A. Thus, the inflator 13 is secured to the side plate 14A with the mounting member 31.

The inflator 13 and the above-mentioned control unit (not shown) are connected together with a cable 34. The ignition of the inflator 13 is controlled via the cable 34.

Figure 4:
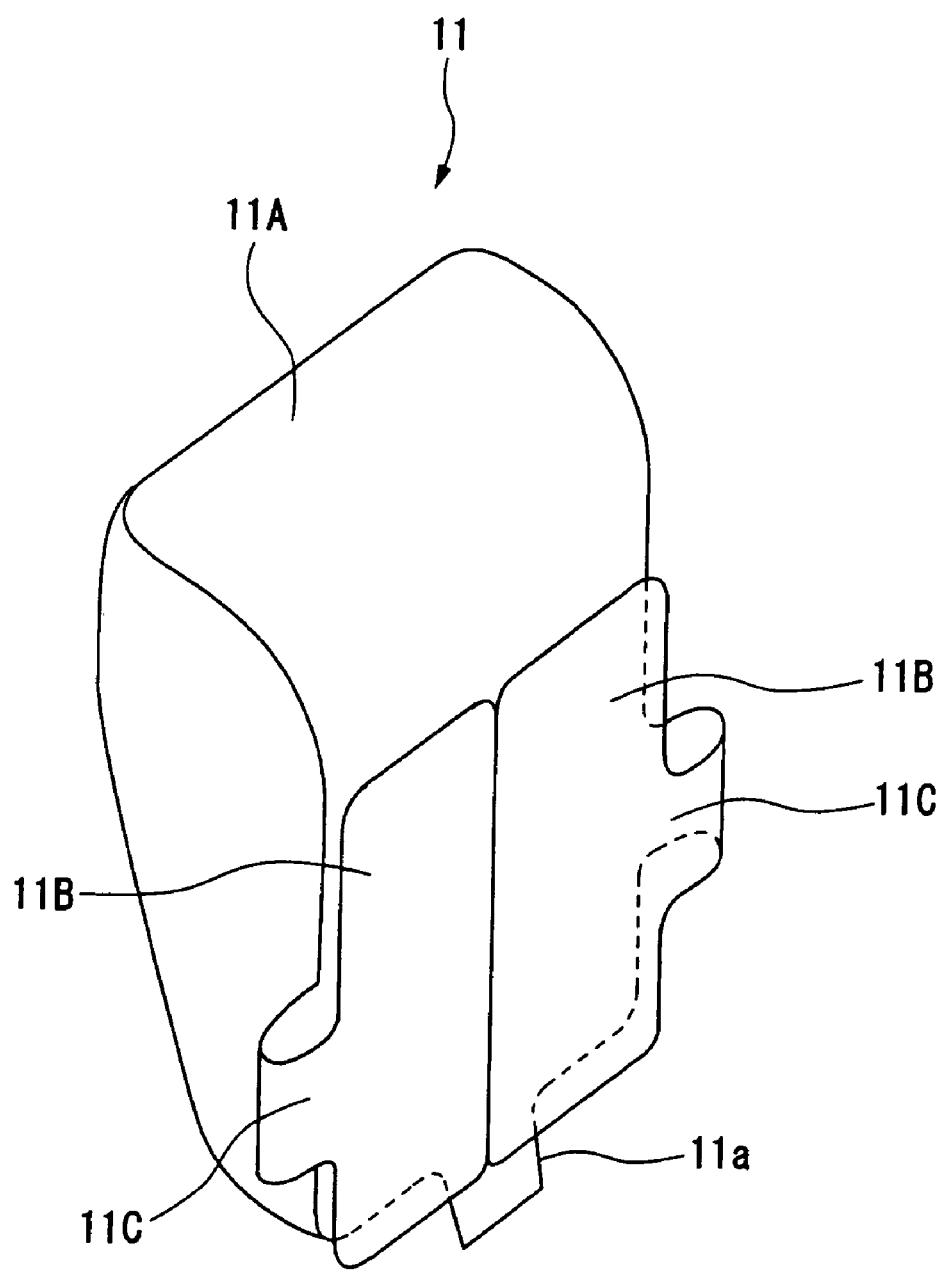
FIG. 4 is a perspective view of the entire structure of the airbag halfway through inflation.

FIG. 4 is a perspective view of the entire structure of the airbag 11 halfway through inflation (in a state in which a main chamber inflates).

Referring to FIG. 4, the airbag 11 includes a main bag 11A that contains a main chamber (to be described later) and inflates above the head 2A of the occupant 2, and a pair of subbags 11B and 11B each containing a subchamber 43 (to be described later), disposed opposite to the occupant 2 relative to the main bag 11A (adjacent to the rear of the vehicle, on the right in the drawing), which inflates to push the main bag 11A toward the occupant 2 (to the front of the vehicle, to the left in the drawing), thereby bending the head 2A of the occupant 2 forward. The main bag 11A and the subbags 11B and 11B are joined together with communicating portions 11C and 11C each having a communicating path 44 (to be described later) therein. The main bag 11A has the gas feed port 11a at the bottom thereof. The gas ejected from the inflator 13 passes through the pipe 20 and the gas feed port 11a into the main chamber 42 in the main bag 11A, and passes through the communicating paths 44 and 44 in the communicating portions 11C and 11C into the subchambers 43 and 43. FIG. 4 shows a state in which the gas supplied from the inflator 13 flows into the main chamber 42 to inflate the main bag 11A.

The airbag 11 including the main bag 11A and the subbags 11B are constructed as a single bag 35 formed of a first panel 35A (not shown) adjacent to the occupant 2 (adjacent to the front of the vehicle) and a second panel 35B opposite to the occupant 2 (adjacent to the rear of the vehicle) stitched together.

Figure 5:
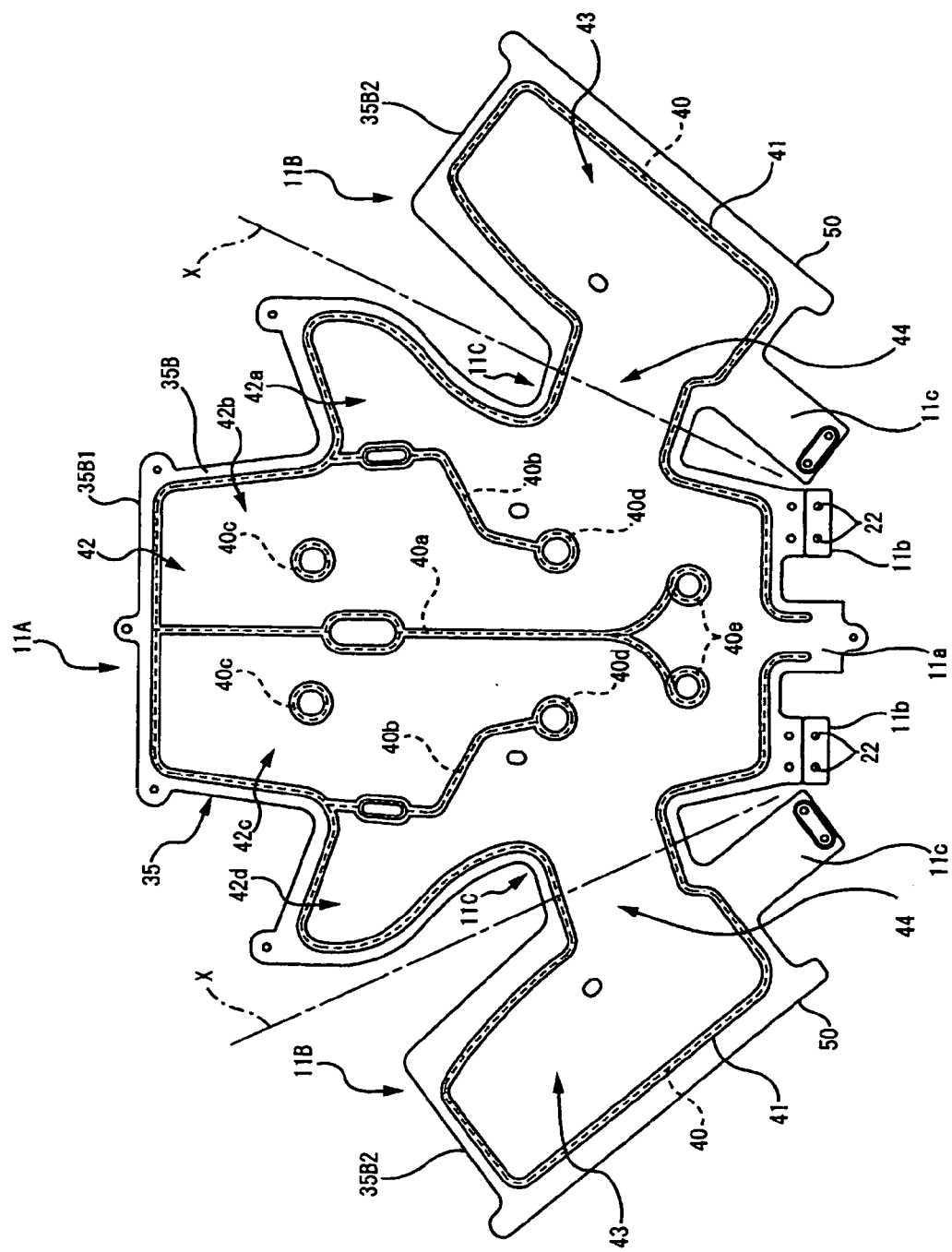
FIG. 5 is a plan view of the entire structure of a bag, as viewed from a second panel.

FIG. 5 is a plan view of the entire structure of the bag 35 before folded (in a state before the subbags 11B shown in FIG. 4 are folded into the back of the main bag 11A), as viewed from the second panel 35B.

As shown in FIG. 5, the bag 35 is constructed as one bag such that the first panel 35A and the second panel 35B in substantially the same shape (FIG. 5 shows only the second panel 35B) are stitched together across the entire periphery except the gas feed port 11a. Numeral 40 indicates the seam thereof, and numeral 41 denotes a sealing member made of an appropriate sealing material disposed along the seam 40 to seal it.

The second panel 35B includes a substantially trapezoidal main bag portion 35B1 expanding from the gas feed port 11a (on the bottom in the drawing) toward the opposite side (to the top in the drawing) and a pair of subbag portions 35B2 and 35B2 disposed on a first side (on the right in the drawing) and a second side (on the left in the drawing). The first panel 35A also has substantially the same shape as the second panel 35B. The first panel 35A and the second panel 35B with this shape are stitched together along the entire periphery except the gas feed port 11a, as described above, so that the main chamber 42, the pair of subchambers 43 and 43 disposed on the first side (on the right in the drawing) and the second side (on the left in the drawing) of the main chamber 42, and the communicating paths 44 and 44 that communicate the main chamber 42 and the subchambers 43 and 43 with each other are formed between the first panel 35A and the second panel 35B. Thus, the main chamber 42, the subchambers 43 and 43, and the communicating paths 44 and 44 are disposed such that the outer rims thereof are enveloped with the continuous seam 40 and the sealing member 41 as a whole.

The main chamber 42 has four chambers 42a, 42b, 42c, and 42d formed by a seam 40a substantially extending along the gas flowing direction substantially in the center thereof and seams 40b and 40b on both sides of the seam 40a (on the right and left in the drawing). This arrangement enables the gas supplied through the gas feed port 11a to be introduced smoothly in a downstream direction of the main chamber 42 (to the above in the drawing).

The bag 35 with the above structure is manufactured in such a manner that: the outer rims of the first panel 35A and the second panel 35B are first stitched together along the seam 40 with the panels 35A and 35B placed one on another, and the panels 35A and 35B are stitched along the seams 40a and 40b, and seams 40c, 40d, and 40e, and are then folded along the fold lines X so that the subbags 11B and 11B on both sides are moved opposite to the occupant 2 (adjacent to the rear of the vehicle) relative to the main bag 11A, as shown in FIG. 4; and the subbags 11B and 11B are stitched together (ends 50 and so on are stitched together) to hold the state; and thereafter, the rims of the subbags 11B and 11B (the parts outside the seam 40) and the center of the main bag 11A are stitched together to hold the subbags 11B and 11B in the folded state. The airbag 11 is housed in the folded state in the retainer 12. At that time, mounting pieces 11c provided at the base end of the subbags 11B (on the bottom in FIG. 5) containing the subchambers 43 and the abovementioned mounting pieces 11b are placed one on another, and the mounting bolts 21a are passed through both of the mounting pieces 11b and 11c.

The airbag 11 of the embodiment with the above structure offers the following advantages.

As has been described, the airbag system 10 of the embodiment is constructed such that when gas is supplied from the inflator 13 into the airbag 11, the gas flows into the main chamber 42 and the subchambers 43 to inflate the main bag 11A and the subbags 11B. This restrains the upward movement of the head 2A of the occupant 2, and pushes the main bag 11A toward the occupant 2 to change the posture of the occupant 2 so as to bend the head 2A of the occupant 2 forward. The embodiment is constructed such that the first panel 35A and the second panel 35B are stitched together, between which the main chamber 42 and the subchambers 43 are provided. This simple structure in which the chambers 42 and 43 are formed only by the pair of panels 35A and 35B facilitates stitching work in comparison with a structure in which the main chamber 42 and the subchambers 43 are constructed of a different pair of panels, and the panel pairs are communicated with each other through holes or tubes. In other words, the airbag 11 including the main chamber 42 and the subchambers 43 may be mass-produced practically and effectively.

According to the embodiment, the communicating paths 44 communicating the main chamber 42 and the subchambers 43 are disposed between the first panel 35A and the second panel 35B stitched together, as described above. This enables the gas from the inflator 13 to be supplied to the subchambers 43 only by supplying the gas to the main chamber 42 through the gas feed port 11a.

According to the embodiment, the airbag 11 is constructed such that the subchambers 43 and 43 in an unfolded state are disposed on the first side and the second side of the main chamber 42, and the communicating paths 44 and 44 extend from the main chamber 42 to the two subchambers 42 on the first and second sides, as described above. This arrangement enables the gas from the inflator 13 to be supplied into the subchambers 43 and 43 disposed on the first and second sides through the main chamber 42 and the communicating paths 44 at the inflation of the airbag 11 to deploy the main bag 11A above the head 2A of the occupant 2 and to deploy the subbags 11B and 11B. This enables the main bag 11A to be pushed toward the head 2A of the occupant 2, thereby bending the head 2A of the occupant 2 forward. As a result, a load on the neck of the occupant 2 can be decreased.

According to the embodiment, the sealing member 41 made of an appropriate sealing material is disposed along the seam 40, as described above. This enables the leakage of gas from the seam 40 to be reduced. Also, the embodiment is constructed such that the main chamber 42, the subchambers 43 and 43, and the communicating-paths 44 and 44 are enveloped with the continuous sealing member 41 that seals the seam 40. Thus, the main chamber 42 and the subchambers 43 can be formed between the panels 35A and 35B with a simple structure of the necessary and minimum stitches and sealing member.

According to the embodiment, the first panel 35A and the second panel 35B are stitched together to form the airbag 11 (bag 35), as described above. Alternatively, for example, the first panel 35A and the second panel 35B are joined by another joining mechanism such as hollow weave.

Priority Application 2005-294219, filed Oct. 06, 2005 including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the from the present disclosure within the scope and spirit of the present invention are to be included as further embodiments of the present invention. The scope of the present invention is to be defined as set forth in the following claims.

What is claimed is:

1. An airbag including a first panel adjacent to an occupant and a second panel opposite the occupant, the first and second panels being joined together between the first panel and the second panel, the airbag comprising:
   a main chamber for deploying above the head of the occupant with pressure fluid supplied from an inflator; and
   first and second subchambers for deploying so as to bend the head of the occupant forward with the pressure fluid supplied from the inflator,
   wherein the first and second subchambers extend from a left and right side, respectively, of the main chamber, and wherein the first and second subchambers each include a communication portion and a main subchamber portion, the communication portion being shorter in a length direction than the main subchamber portion,
   wherein the first and second subchambers are formed by the shape of the first and second panels, and
   wherein topmost ends of the first and second subchambers are positioned below a topmost end of the main chamber prior to folding of the airbag.

2. The airbag according to claim 1, wherein the main chamber includes a plurality of chambers formed by a first seam substantially extending along the gas flowing direction substantially in a center of the main chamber.

3. The airbag according to claim 2, wherein the plurality of chambers are further formed by seams on each side of the first seam.

4. The airbag according to claim 1, wherein the subchambers are configured to inflate to push the main chamber towards an occupant's head.

5. The airbag according to claim 1, wherein a gas feed port for the inflator is located at a bottom of the main chamber.

6. An airbag system comprising:
   airbag including a first panel adjacent to an occupant and a second panel opposite the occupant, the first and second panels being joined together between the first panel and the second panel, the airbag comprising:
   a main chamber for deploying above the head of the occupant with pressure fluid supplied from an inflator; and
   first and second subchambers for deploying so as to bend the head of the occupant forward with the pressure fluid supplied from the inflator; and
   an inflator that supplies pressure fluid for inflating the airbag,
   wherein the first and second subchambers extend from a left and right side, respectively, of the main chamber, and wherein the first and second subchambers each include a communication portion and a main subchamber portion, the communication portion being shorter in a length direction than the main subchamber portion,
   wherein the first and second subchambers are formed by the shape of the first and second panels, and
   wherein each of the communication portions are defined on opposite sides by an outer peripheral seam of the airbag.

7. The airbag system according to claim 6, wherein the main chamber includes a plurality of chambers formed by a first seam substantially extending along the gas flowing direction substantially in a center of the main chamber.

8. The airbag system according to claim 7, wherein the plurality of chambers are further formed by seams on each side of the first seam.

9. The airbag system according to claim 6, wherein the subchambers are configured to inflate to push the main chamber towards an occupant's head.

10. The airbag system according to claim 6, wherein a gas feed port for the inflator is located at a bottom of the main chamber.

* * * * *